(12) United States Patent
Watanuki

(10) Patent No.: US 6,267,903 B1
(45) Date of Patent: Jul. 31, 2001

(54) PREVENTION OF DAMAGE DUE TO STATIC ELECTRICITY DURING MANUFACTURING OF MAGNETIC HEAD

(75) Inventor: Motoichi Watanuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/209,728

(22) Filed: Dec. 11, 1998

(30) Foreign Application Priority Data

Aug. 10, 1998 (JP) .................................................. 10-226145

(51) Int. Cl.⁷ ...................................................... G11B 5/127
(52) U.S. Cl. .................. 216/22; 29/603.07; 204/192.34; 360/323
(58) Field of Search ............................... 216/22; 360/323; 361/212, 220; 29/603.07; 204/192.34

(56) References Cited

U.S. PATENT DOCUMENTS

| 4,317,149 | * | 2/1982 | Elser et al. ........................... 360/126 |
| 4,987,514 | * | 1/1991 | Gailbreath et al. ................... 361/220 |
| 5,247,413 | * | 9/1993 | Shibata et al. ........................ 360/113 |
| 5,272,582 | * | 12/1993 | Shibata et al. ....................... 360/113 |
| 5,375,022 | * | 12/1994 | Gill et al. .............................. 360/113 |
| 5,465,186 | * | 11/1995 | Bajorek et al. ....................... 306/113 |
| 5,491,605 | * | 2/1996 | Hughbanks et al. ................. 360/113 |
| 5,757,591 | * | 5/1998 | Carr et al. ............................. 360/113 |
| 5,777,829 | * | 7/1998 | Voldman et al. ..................... 360/128 |
| 6,054,330 | * | 4/2000 | Phipps et al. ............................ 438/3 |

FOREIGN PATENT DOCUMENTS

651375 A1 * 5/1995 (EP) .
08221721A   8/1996 (JP) .

* cited by examiner

Primary Examiner—Anita Alanko
(74) Attorney, Agent, or Firm—Greer, Burns & Crain, Ltd.

(57) ABSTRACT

The method of manufacturing a magnetic head is capable of preventing element sections from being damaged by static electricity and which is capable of keeping prescribed characteristics of the magnetic head. The method of the present invention comprises the steps of: forming film layers on a surface of a substrate; etching the film layers to form into prescribed patterns; and forming an element section having prescribed characteristics, wherein a specific section of the substrate, in which the element section is formed, is enclosed by electric conductive film.

8 Claims, 6 Drawing Sheets

PREVENTION OF DAMAGE DUE TO STATIC ELECTRICITY DURING MANUFACTURING OF MAGNETIC HEAD

BACKGROUND OF THE INVENTION

The present invention relates to a method of manufacturing a magnetic head, and more precisely relates to a method of manufacturing a magnetic head, which is capable of preventing an element or elements from being damaged by static electricity which is generated while manufacturing the magnetic head.

The magnetic heads for magnetic disc drive units are manufactured by the steps of: forming magnetizable film layers and non-magnetizable film layers on a surface of a ceramic substrate, which is formed into a wafer; and patterning the film layers. To execute the patterning step, first a resist layer is formed on the film layers and formed into prescribed patterns, then the film layers, which are masked with the patterned resist layer, are patterned by ion milling, sputtering, etc.

While executing treatments of the film layers, e.g., trimming by ion milling, pattern etching by dry etching, cleaning the surface of the film layers by sputter-etching, static electricity is charged on the surface of the film layers; the static electricity damages sensing parts of element sections of the magnetic heads and badly influences characteristics of the magnetic heads. To solve these disadvantages, an ion milling device neutralizes ions so as not to charge the static electricity in a work piece.

In the conventional method of manufacturing the magnetic head, damaging the element sections by static electricity was not a serious problem. However, in the case of spin valve heads capable of writing data with high density, the element sections are apt to be damaged by static electricity, so it is necessary to protect the element sections from the static electricity. In conventional magnetic heads, about 20 [V] of static electricity damages the element sections; in spin valve heads, about 5 [V] of static electricity damages the element sections.

In some cases, the film layers are etched to form into a plurality of isolated islands, so influences of static electricity must be prevented.

SUMMARY OF THE INVENTION

An object of the present invention is to provide a method of manufacturing a magnetic head which is capable of preventing the element sections from being damaged by static electricity and which is capable of keeping prescribed characteristics of the magnetic head. Another object is to provide a method of manufacturing a magnetic head, which is capable of highly improving yield of manufacturing.

To achieve the objects, the method of manufacturing the magnetic head comprises the steps of: forming film layers on a surface of a substrate; etching the film layers to form into prescribed patterns; and forming an element section having prescribed characteristics, wherein a specific section of the substrate, in which the element section is formed, is enclosed by electric conductive film.

In the method, an electric conductive layer, in which a sensing part of the element section is formed, may be formed on the substrate, then the specific section is etched to form the element section.

In the method, an upper shielding layer may be formed on the sensing part of the element section after the sensing part is formed, then the electric conductive layer around the element section may be removed.

Another method of manufacturing the magnetic head comprises the steps of: forming film layers on a surface of a substrate; etching the film layers into prescribed patterns; and forming a plurality of element sections having prescribed characteristics, wherein cable patterns, which are connected to terminals of the element sections or coils, are mutually connected for further treatment.

In the method, write-heads of the element sections may be formed by the steps of: forming a write-gap layer; an electric conductive film, which is formed into the cable patterns, is formed on the write-gap layer; and etching the electric conductive film to mutually connect the cable patterns.

In the methods, each of the etching may be executed by ion milling.

In each of the methods, the electric conductive film may be electrically grounded for further treatment.

In the method of the present invention, the specific section of the substrate, in which the element section is formed, is enclosed by electric conductive film, then the film layers are etched by ion milling or piled by sputtering. During the manufacturing process, electric current caused by static electricity is prevented from passing through the sensing part of the element section, so that damaging the element sections can be prevented and the yield of manufacturing can be highly improved.

The electric conductive film is left when the electric conductive layer and the shielding layer of the sensing part are etched, so the magnetic head can be manufactured without sharply changing the conventional method.

By connecting the electric conductive film to the ground or by mutually connecting the terminals of the element sections, damaging the element sections can be effectively prevented.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
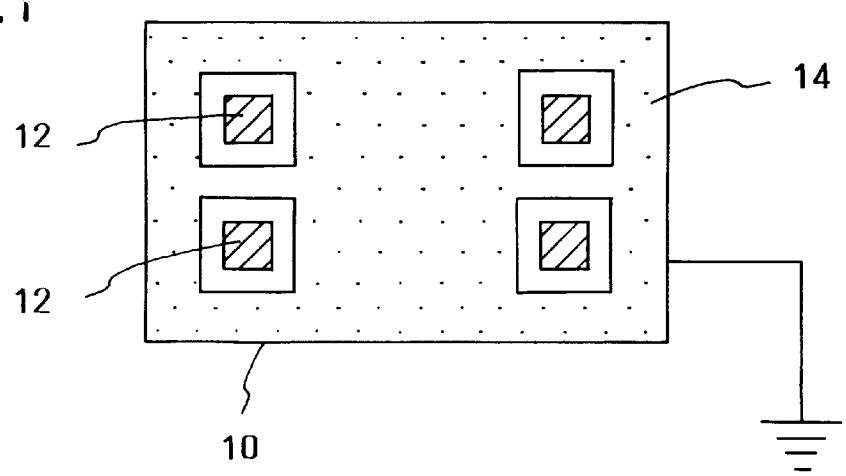
FIG. 1 is a plan view showing means for protecting elements from the static electricity.

FIG. 1 is a plan view showing means for protecting elements from static electricity. A reference symbol 10 stands for a wafer-shaped substrate on which a plurality of film layers are formed to manufacture the magnetic heads; reference symbols 12 stand for element sections formed on the substrate 10; a reference symbol 14 stands for an electric conductive film, which is formed on a surface of the substrate 10 and which encloses the element sections 12. The electric conductive film 14 is integrated with the substrate 10 and is electrically grounded.

The electric conductive film 14 prevents electric current, which is caused by static electricity when the ion milling or the spattering is executed, from passing through the element sections, so that the elements can be protected.

The electric conductive film 14 may be formed in a step of forming the film layers for the elements. Further, a magnetizable layer and shielding layers, which are electric conductive film layers for the elements, may act as the electric conductive film 14. In this case, the protecting means can be produced easily.

The method of manufacturing the magnetic heads, with the protecting means for each step, will be explained.

Figure 2A:
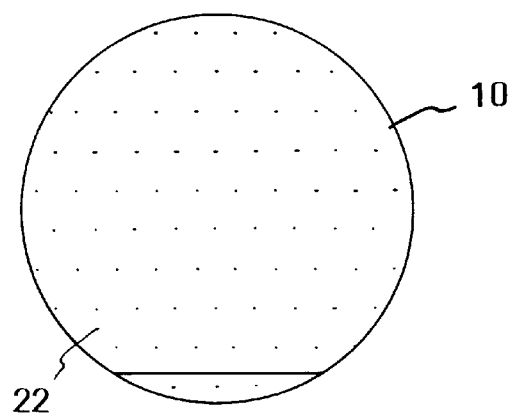
FIG. 2A is a plan view of a substrate on which film layers are formed.
Figure 2B:
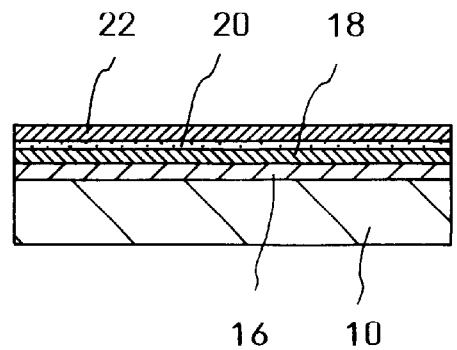
FIG. 2B is a sectional view of the substrate on which the film layers are formed.

FIG. 2A is a plan view of the substrate 10 on which the MR film layer is formed; and FIG. 2B is a sectional view thereof. In FIG. 2B, a reference symbol 16 stands for a protecting layer formed on the surface of the substrate 10; a reference symbol 18 stands for a biasing layer, which is the magnetizable layer; a reference symbol 20 stands for a first gap layer, which is a non-magnetizable layer; a reference symbol 22 stands for a free layer, which is an electrically conductive magnetizable layer. The magnetic head of the present embodiment is a three-layered head, but the method can be applied to other types of magnetic heads, e.g., a spin valve head, which have other structures of the film layers.

Figure 3A:
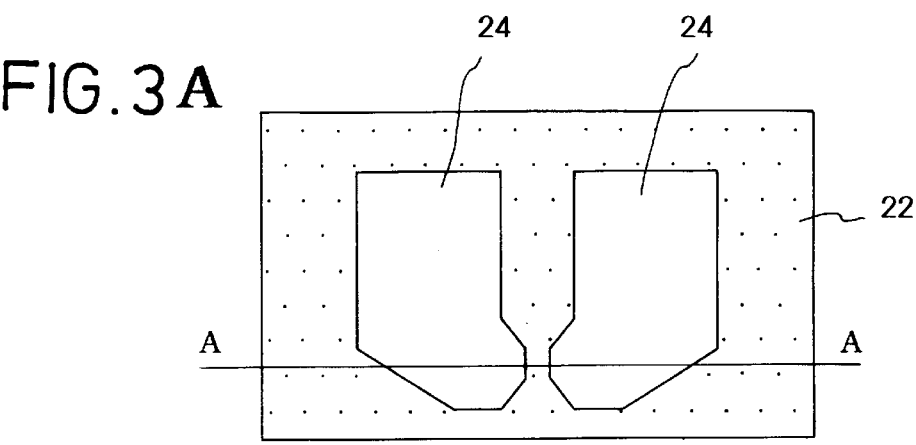
FIG. 3A is a plan view of the substrate on which terminals are formed.
Figure 3B:
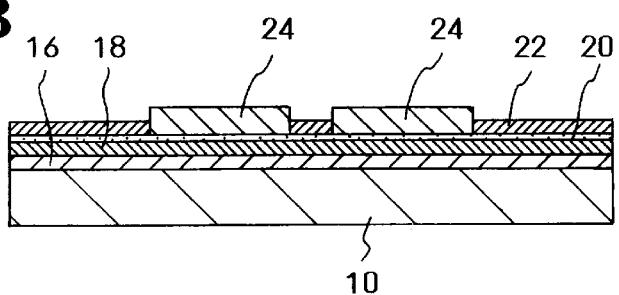
FIG. 3B is a sectional view of the substrate on which the terminals are formed.

In the three-layered substrate, terminal sections 24 (see FIGS. 3A and 3B) are formed by trimming the free layer 22. The trimming is executed by ion milling. FIG. 3A is a plan view of the substrate on which the terminals 24 are formed; FIG. 3B is a sectional view thereof. The terminal sections 24 are formed by the steps of: forming a resist layer on a surface of the free layer 22; exposing parts in which the terminal sections 24 will be formed; removing the free layer 22 in the parts for the terminal sections 24 by ion milling; the sputtering. Since the free layer 22 is wholly electrically connected to the substrate 10, the problems of static electricity are not caused during the ion milling.

Figure 4A:
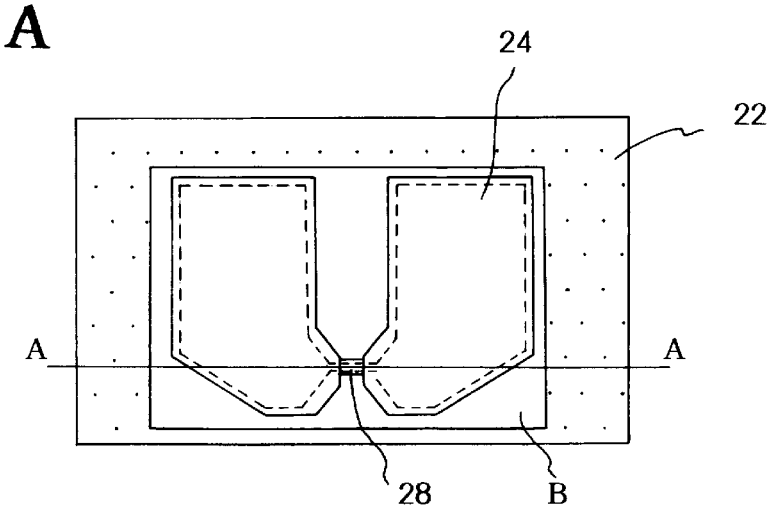
FIG. 4A is a plan view of the substrate in which a peripheral of the terminals is rectangularly machined.
Figure 4B:
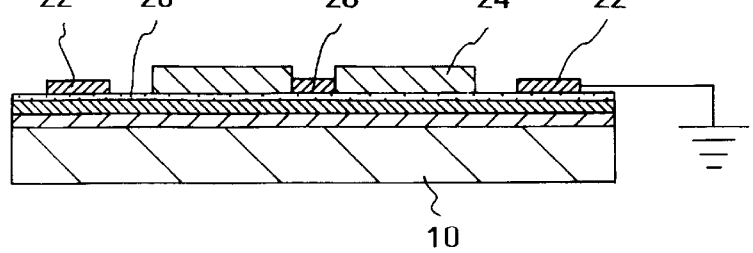
FIG. 4B is a sectional view of the substrate in which the peripheral of the terminals is rectangularly machined.

Next, a peripheral of each element section is rectangularly machined. FIG. 4A is a plan view of one element section in which a peripheral of the terminals 24 is rectangularly machined; FIG. 4B is a sectional view thereof. In a section "B", the free layer 22 is removed and the first gap layer 20 is exposed. FIG. 4B is the sectional view taken along a line A—A in FIG. 4A. In the step of the ion milling, the method is characterized in that the terminal sections 24 and the sensing part 28 are covered with the resist film during the ion milling, and the section "B" and its peripheral are also covered with the resist film so as to leave the free layer 22. The free layer 22 is the electric conductive layer, and the free layer 22 left is formed like a frame and is electrically grounded, so that the bad influences of static electricity can be avoided during the ion milling.

Figure 5:
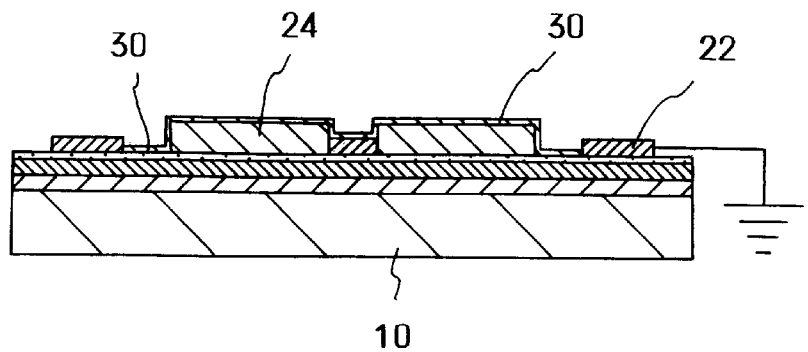
FIG. 5 is a sectional view of an element section on which a second gap layer is formed.

Next, a second gap layer 30 (see FIG. 5), which is a non-magnetizable layer, is formed. FIG. 5 is a sectional view of the substrate on which the second gap layer 30 is formed. The second gap layer 30 is an alumina film layer. First, the alumina film layer is wholly formed on the surface of the substrate 10, then the alumina film layer, which is not located in the section "B", is removed by ion milling, so that the second gap layer 30 is left in the section "B" only. To leave the second gap layer 30 in the section "B", the section "B" is covered with the resist layer, but other sections are exposed during the ion milling. The free layer 22 is electrically grounded, so the ion milling can be executed without the bad influences of static electricity.

Next, upper shielding layers are formed on surfaces of the element sections. The upper shielding layers are formed by plating. In the state shown in FIG. 5, a plating base 32 (see FIG. 6B) is formed to cover each element section and its peripheral. The plating base 32 is formed by plating or sputtering.

Figure 6A:
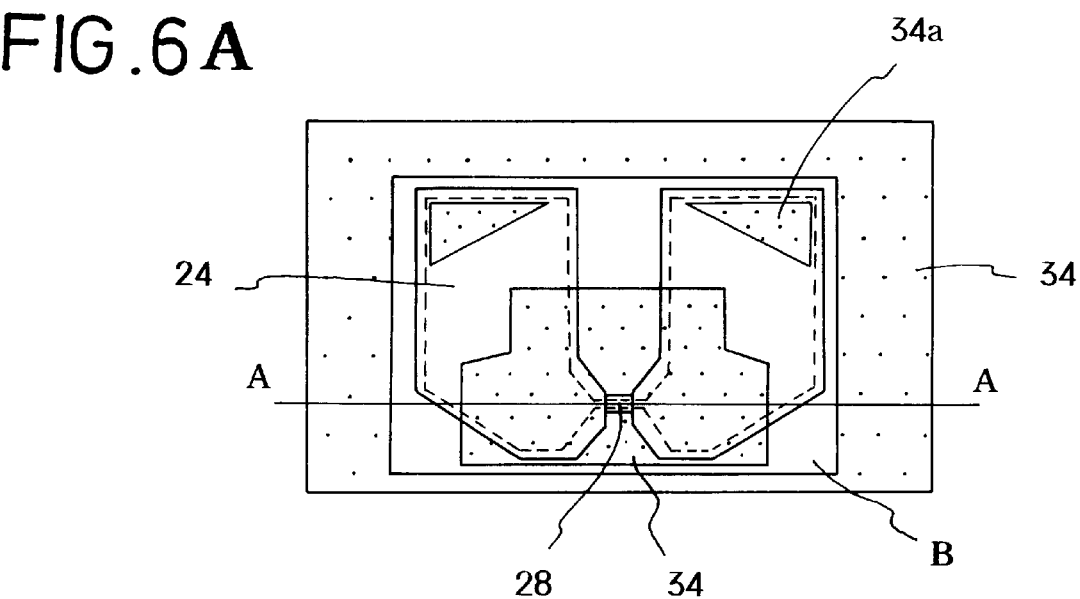
FIG. 6A is a plan view of the substrate on which upper shielding layers are formed.
Figure 6B:
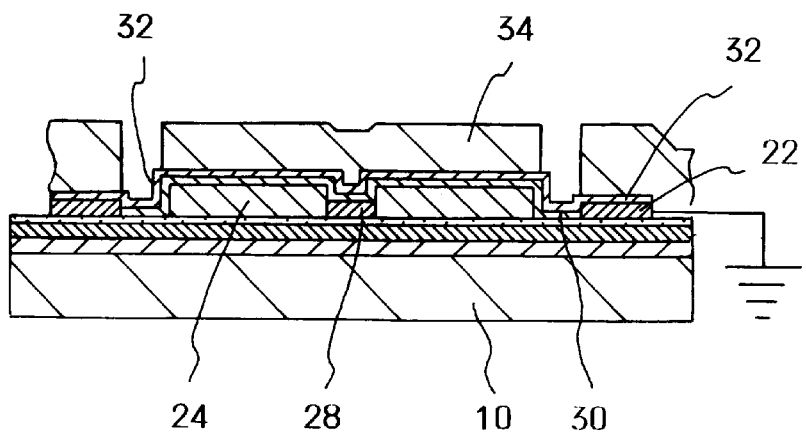
FIG. 6B is a sectional view of the substrate on which the upper shielding layers are formed.

After the plating base 32 is formed as a layer for supplying electricity, the upper shielding layers 34 are formed by plating. In the present embodiment, the upper shielding layers are made of permalloy. FIG. 6A is a plan view of the substrate on which the upper shielding layers 34 are formed; FIG. 6B is a sectional view thereof. One section of upper shielding layer 34 covers over ends of the terminal sections 24 and the sensing part 28; and another section of upper shielding layer 34 is located outside of the section "B".

The upper shielding layers 34 are formed by the steps of: masking the surface of the substrate with a resist film, which exposes the parts to be plated; and executing emboss plating. A reference symbol 34a stands for a connecting part, which connects cable patterns with the terminal section 24. In the connecting parts 34a, the second gap layers 30 have been previously removed to conductive electricity, then the plating base 32 and the upper shielding layers 34 are formed.

Figure 7:
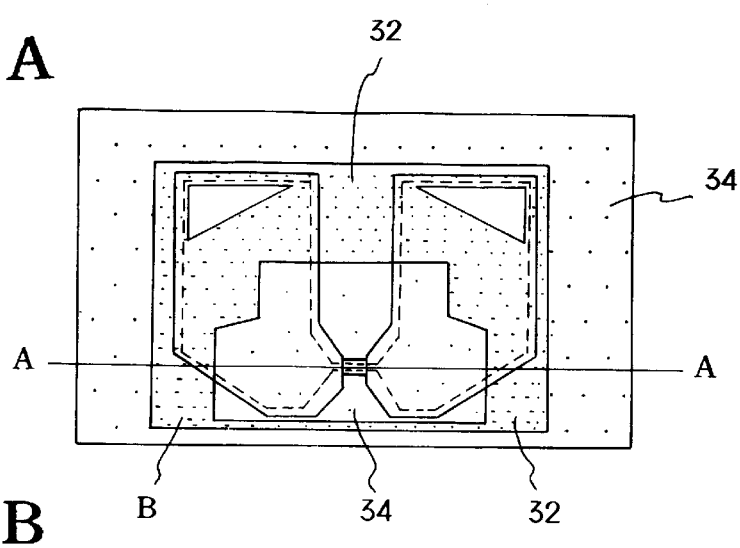
FIG. 7A is a plan view of the substrate from which disused parts of a plating base are removed.
FIG. 7B is a plan view of the substrate from which the disused parts of the plating base are removed.
Figure 7:
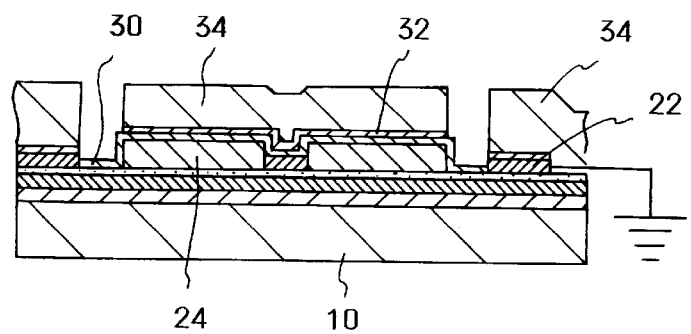

Next, disused parts of the plating base 32 are removed by ion milling. The disused parts of the plating base 32 are shown in FIG. 7A. Namely, the parts of the plating base 32 which are exposed in the section "B" are the disused parts to be removed. FIG. 7B is a sectional view in which the disused parts of the plating base 32 have been removed. In this step too, the free layer 22 is electrically grounded, so the bad influences of static electricity can be avoided.

After the upper shielding layers 34 are formed, parts of the upper shielding layers 34, which do not correspond to the element sections, and the free layer 22 are removed by chemical etching.

FIGS. 8A and 8B show a state in which the element section is left on the substrate 10. In the peripheral of the element section, the first gap layer 20 is exposed. One element section is shown in the drawing, but there are many element sections that are metrically arranged in the actual substrate 10.

In the element section, the second gap layer 30, the plating layer 32 and the upper shielding layer 34 are piled, in this order, on each of the terminal sections 24 and the sensing part 28. They constitute a read-section of the magnetic head.

The free layer 22, which is the electric conductive layer, is left on and around the element sections until the upper shielding layers 34 are formed or the read-section is constituted. The free layer 22 is formed in one body and is electrically grounded, so that static electricity never badly influences the element sections, especially the sensing parts 28, while executing the sputtering, etc.

After the upper shielding layers 34 are formed, a write-head is formed thereon. In the steps of forming the write-head, the ion milling, etc. are executed, so a counter-measure to the static electricity is required.

Figure 8:
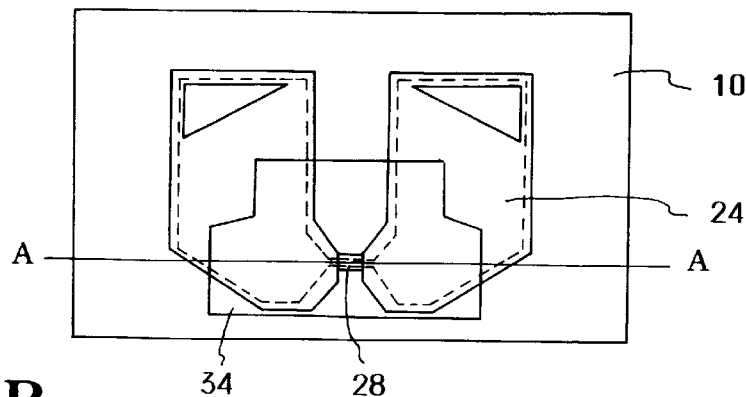
FIG. 8A is a plan view of the substrate from which the upper shielding layers and a free layer of parts other than the element sections are removed.
FIG. 8B is a plan view of the substrate from which the upper shielding layers and the free layer of parts other than the element sections are removed.
Figure 8:
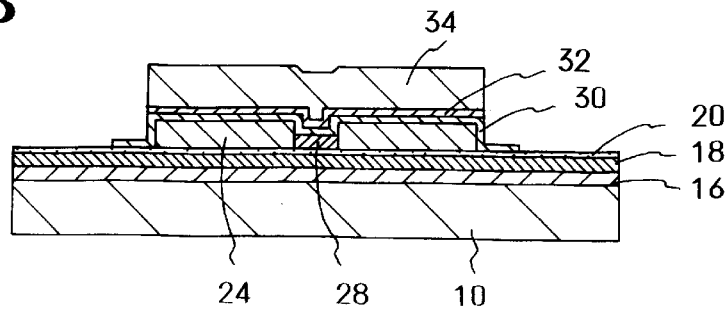
Figure 9:
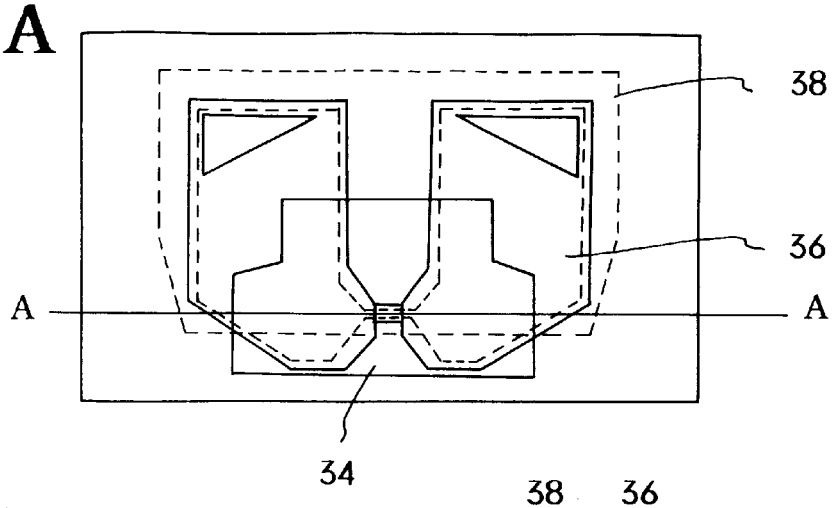
FIG. 9A is a plan view of the substrate in which a write-gap layer and a coil insulating layer are formed on surfaces of the element sections.
FIG. 9B is a sectional view of the substrate in which the write-gap layer and the coil insulating layer are formed on the surfaces of the element sections.
Figure 9:
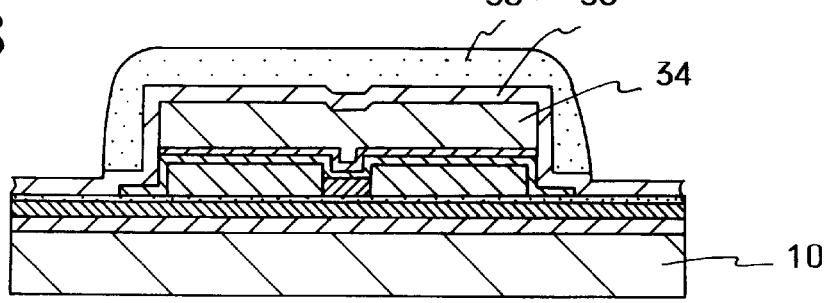

In FIG. 9, a write-gap layer 36 and a coil insulating layer 38 are formed on the element section, which is shown in FIG. 8. The write-gap layer 36 is an alumina film layer; the coil insulating layer 38 is a resist layer.

Figure 10:
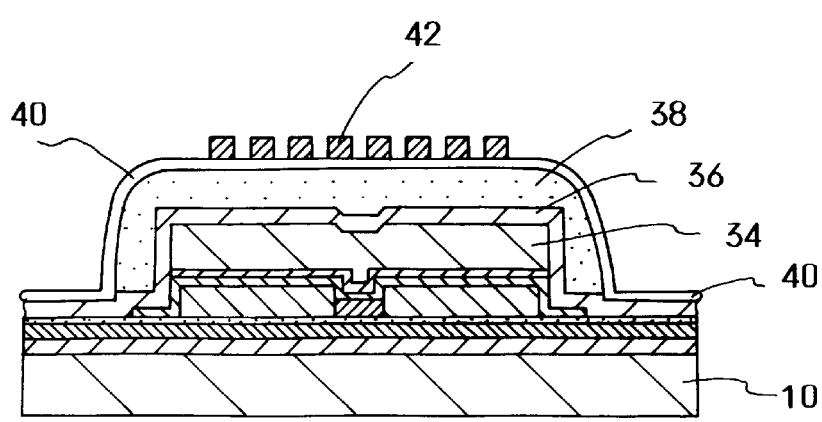
FIG. 10 is a sectional view of the substrate in which the plating base is formed on a surface of the coil insulating layer.

A coil 42 is formed on the coil insulating layer 38. The coil 42 is formed by plating, so first a plating base 40 is formed on the coil insulating layer 38 by copper plating or copper sputtering. FIG. 10 shows a state in which the plating base 40 is formed on the surface of the coil insulating layer 38 and the coil 42 is formed thereon. Note that, the plating base 40 acts as a layer for supplying electricity for forming not only the coil 42 but also the vertical terminals (write-terminals and read-terminals), which will be formed by plating. The plating base 40 is wholly formed on the surface of the substrate.

The coil 42 is formed by the steps of: forming the resist layer on the substrate; forming a resist pattern, which exposes the plating base 40 in the form of a pattern of the coil 42; and executing emboss plating.

Figure 11:
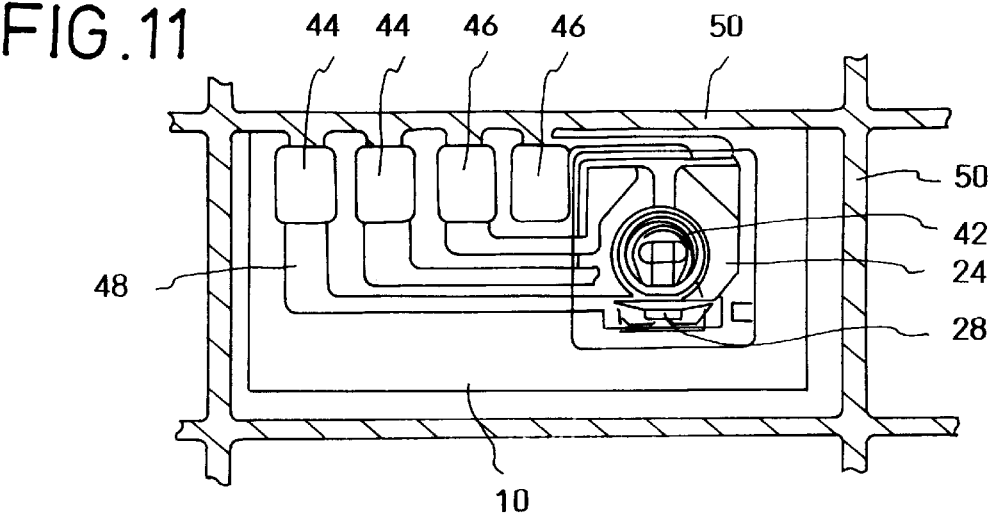
FIG. 11 is an explanation view showing a planar arrangement of the element section, vertical terminals, cable patterns and the electric conductive film.

The plating base 40 between coil patterns is removed, by ion milling, in the following step, then the plating base 40 is used as the electric supplying layer and the vertical terminals are plated. In FIG. 11, reference symbols 44 stand for the write-terminals of the vertical terminals; reference symbols 46 stand for the read-terminals thereof. The vertical terminals 44 and 46 are formed by the steps of: forming the resist layer, which exposes parts of forming the vertical terminals 44 and 46, on the surface of the plating base 40; and executing emboss plating.

Cable patterns 48, which electrically connect the vertical terminals 44 and 46 with the terminal sections 24, are formed by ion milling the plating base 40.

While executing the ion milling the plating base 40, an electric conductive film 50 is also formed so as to prevent the bad influences caused by static electricity.

The element section, the coil 42, the vertical terminals 44 and 46, the cable patterns 48, etc., which should be left on the substrate, and parts of the electric conductive layer 50, which should be left as shown in FIGS. 11, are covered with the resist, then ion milling is executed to form prescribed patterns on the substrate 10.

The electric conductive layer 50 short-circuits the terminals and encloses each element section. The electric conductive layer 50 is electrically grounded. Since the electric conductive layer 50 short-circuits the terminals, no electric current passes through the element sections during the ion milling. While ion milling, the plating base 40 between coil patterns is removed to complete the coil 42.

Figure 13:
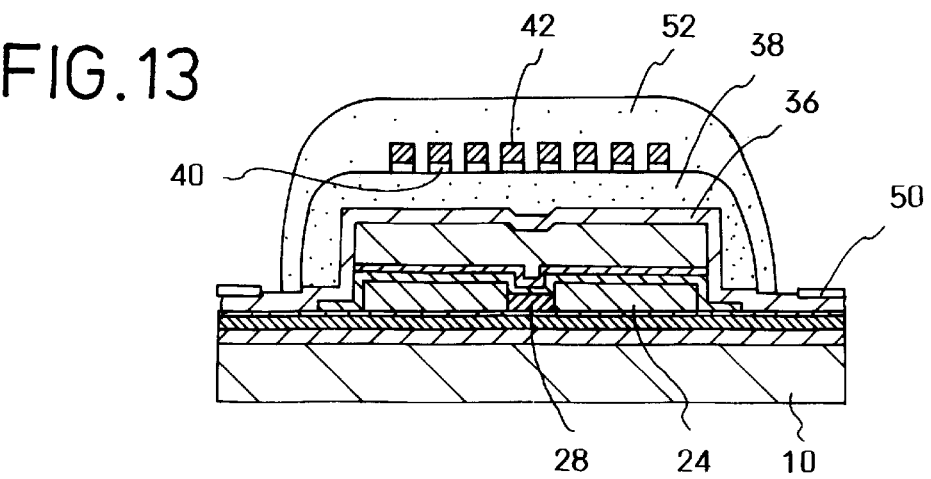
FIG. 13 is a sectional view of a magnetic head.

FIG. 13 shows a state in which an upper insulating layer 52 is formed on the surface of the element section after the coil 42, the vertical terminals 44 and 46 and the cable patterns 48 are formed by ion milling. Afterwards each element is separated from the substrate 10 to complete the magnetic head. In FIG. 13, the electric conductive film 50 is formed on the surface of the substrate 10, so the elements should be separated so as not to short-circuit the terminals by the electric conductive film 50.

In the case of measuring static characteristics of the magnetic heads, first the short-circuited parts are cut by scribing the electric conductive film 50 and the static characteristics are measured, then the elements or the magnetic heads are completely separated by cutting the substrate 10.

Figure 12:
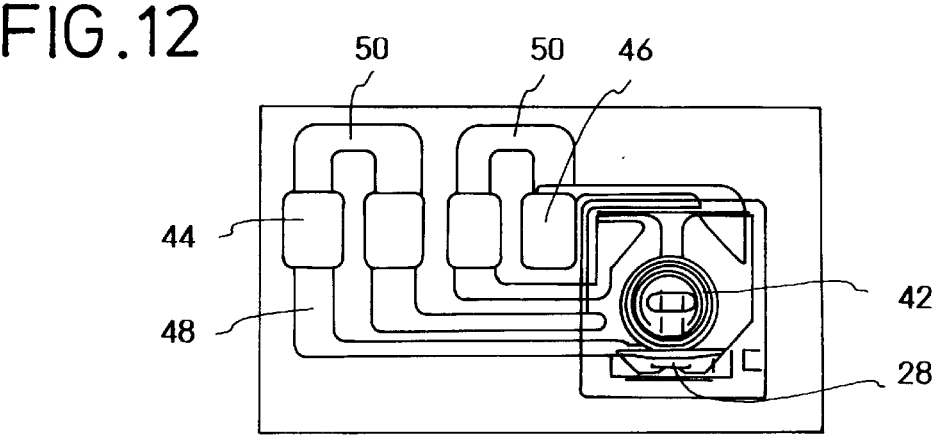
FIG. 12 is an explanation view showing another example of the electric conductive film.

Another embodiment of the electric conductive film 50 for preventing bad influences caused by the static electricity is shown in FIG. 12. In this embodiment, the write-terminals 44 and 44 and the read-terminals 46 and 46 are respectively short-circuited by the electric conductive film 50. Since the terminals are short-circuited by the electric conductive film 50, no electric current caused by static electricity passes through the sensing parts 28, so this structure can be an effective countermeasure to static electricity.

In the above described embodiments, the sensing part 28 includes the biasing layer 18, the first gap layer 20 and the free layer 20, but the structure of the sensing part 28 is not limited to said structure. In the case of a sensing part of a multi-layered spin valve head, for example, the shielding layer, which is the electric conductive layer, may be used as the electric conductive layer for preventing the bad influences of static electricity, so that the magnetic heads can be manufactured with an effective countermeasure to static electricity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and ranging of equivalency of the claims are therefore intended to be embraced therein.

What is claimed is:

1. A method of manufacturing a magnetic head, comprising of the steps of:
    forming film layers on a surface of a substrate;
    etching said film layers to form prescribed patterns; and
    forming a plurality of element sections,
    wherein, in the forming step, at least a bias layer, a gap layer and a magnetizable layer are formed on the surface of said substrate so as to form sensing parts of said element sections, and
    wherein, in the etching step, an electric conductive film of said film layers is etched so as to respectively enclose specific sections of said substrate within which each said element section is formed, and further wherein said electric conductive film that encloses each of said specific sections is formed into a frame-shape and is separate from each of said element sections.

2. The method according to claim 1, wherein said electric conductive film constitutes the sensing parts of said element section.

3. The method according to claim 2, wherein an upper shielding layer, which is a predetermined pattern, is formed on the sensing parts of said element sections after the sensing parts are formed, then portions of said electric conductive layer around said element sections are removed.

4. The method according to claim 1, wherein said etching is executed by ion milling.

5. The method according to claim 1, wherein said electric conductive film is electrically grounded for further treatment.

6. A method of manufacturing a magnetic head, comprising the steps of:

forming film layers on a surface of a substrate;

etching said film layers to form into prescribed patterns, and forming a plurality of element sections, wherein an upper shielding layer, which is formed on sensing parts of said element sections, is covered with a write-gap layer, then an electric conductive film is formed on said write-gap layer when write heads are formed on the sensing parts of the element sections, and wherein cable patterns, which are connected to terminals of said element sections on the substrate, and short patterns, which respectively enclose said element sections and electrically short said cable patterns, are formed by removing a portion of said electric conductive film.

7. The method according to claim 6, wherein said etching is executed by ion milling.

8. The method according to claim 6, wherein said electric conductive film is electrically grounded for further treatment.

* * * * *